United States Patent
Umebayashi

(10) Patent No.: US 9,080,071 B2
(45) Date of Patent: Jul. 14, 2015

(54) INKJET INK COMPOSITION AND METHOD FOR PRODUCING THE SAME, INKJET RECORDING METHOD, PIGMENT DISPERSION FOR INKJET INK AND METHOD FOR PRODUCING THE SAME

(71) Applicant: FUJIFILM CORPORATION, Tokyo (JP)

(72) Inventor: Tsutomu Umebayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 14/011,578

(22) Filed: Aug. 27, 2013

(65) Prior Publication Data

US 2014/0063127 A1 Mar. 6, 2014

(30) Foreign Application Priority Data

Aug. 29, 2012 (JP) ................. 2012-189065

(51) Int. Cl.
*C09D 11/322* (2014.01)
*C09D 11/36* (2014.01)
*C09D 11/38* (2014.01)
*C09D 11/101* (2014.01)
*C09D 17/00* (2006.01)

(52) U.S. Cl.
CPC .............. *C09D 11/38* (2013.01); *C09D 11/101* (2013.01); *C09D 11/322* (2013.01); *C09D 11/36* (2013.01); *C09D 17/002* (2013.01)

(58) Field of Classification Search
CPC ....... C09D 11/322; C09D 11/36; C09D 11/38
USPC .................. 106/31.75, 31.78, 31.86
See application file for complete search history.

(56) References Cited

U.S. PATENT DOCUMENTS

| | | | | |
|---|---|---|---|---|
| 5,667,568 | A * | 9/1997 | Sacripante et al. | 106/31.29 |
| 6,210,794 | B1 * | 4/2001 | Nakamura | 428/32.79 |
| 8,507,041 | B2 * | 8/2013 | Goredema et al. | 427/256 |
| 2004/0227798 | A1 | 11/2004 | Nakajima | |
| 2005/0153229 | A1 * | 7/2005 | Miyake et al. | 430/200 |
| 2007/0293601 | A1 | 12/2007 | Ushiku et al. | |
| 2008/0308004 | A1 | 12/2008 | Deroover et al. | |
| 2009/0025603 | A1 | 1/2009 | Kuriyama et al. | |
| 2010/0004360 | A1 | 1/2010 | Carlini et al. | |
| 2011/0141187 | A1 * | 6/2011 | Takabayashi | 347/20 |
| 2011/0146537 | A1 | 6/2011 | Goredema et al. | |
| 2011/0151123 | A1 | 6/2011 | Goredema et al. | |
| 2011/0183125 | A1 * | 7/2011 | Aoki et al. | 106/31.75 |
| 2012/0077913 | A1 | 3/2012 | Birau et al. | |
| 2012/0183895 | A1 | 7/2012 | Iwazaki et al. | |
| 2013/0307913 | A1 * | 11/2013 | Kawashima et al. | 106/31.78 |
| 2014/0065386 | A1 * | 3/2014 | Matsuyama | 428/207 |

FOREIGN PATENT DOCUMENTS

| | | |
|---|---|---|
| JP | H02-155963 A | 6/1990 |
| JP | 09-272265 A | 10/1997 |
| JP | 2004002528 A | 1/2004 |
| JP | 2005-325279 A | 11/2005 |
| JP | 2008-019409 A | 1/2008 |
| JP | 2009-029888 A | 2/2009 |
| JP | 2011-026600 A | 2/2011 |
| JP | 2011-126881 A | 6/2011 |
| JP | 2012-072401 A | 4/2012 |
| JP | 2012-153796 A | 8/2012 |
| WO | 2009/098509 A1 | 8/2009 |

OTHER PUBLICATIONS

An Office Action; "Notice of Reasons for Rejection," issued by the Japanese Patent Office on Sep. 2, 2014, which corresponds to Japanese Patent Application No. 2012-189065 and is related to U.S. Appl. No. 14/011,578; with English language translation.

The extended European search report issued on Nov. 27, 2013, which corresponds to European Patent Application No. 13181688.6-1302 and is related to U.S. Appl. No. 14/011,578.

* cited by examiner

*Primary Examiner* — Helene Klemanski
(74) *Attorney, Agent, or Firm* — Studebaker & Brackett PC

(57) ABSTRACT

An inkjet ink composition includes (component A) C.I. Pigment Yellow 180, (component B) a fatty acid amide compound, and (component C) a high molecular weight dispersant. The method of producing an inkjet ink composition includes preliminary mixing (component A) C.I. Pigment Yellow 180 and (component B) a fatty acid amide compound to obtain a mixture, and mixing the mixture and (component C) a high molecular weight dispersant.

11 Claims, No Drawings

INKJET INK COMPOSITION AND METHOD FOR PRODUCING THE SAME, INKJET RECORDING METHOD, PIGMENT DISPERSION FOR INKJET INK AND METHOD FOR PRODUCING THE SAME

BACKGROUND OF THE INVENTION

1. Field of the Invention

The present invention relates to an inkjet ink composition and a method for producing the same, an inkjet recording method, a pigment dispersion and a method for producing the same.

2. Description of the Related Art

Inkjet systems ejecting an ink composition as droplets from ink ejection ports are widely used in many printers for reasons such as being compact and inexpensive, and enabling image forming on a recording medium without contact. Also among these inkjet systems, a piezo inkjet system using the deformation of a piezoelectric element to eject ink and a thermal inkjet system using a phenomenon of boiling of the ink composition by thermal energy to eject the ink composition as droplets have high resolution and excellent high-speed printing characteristics.

Here, over several years, there has been development of commercial printing and industrial printing using inkjet printers, without being limited to photo printing or document printing for domestic use or office use. In particular, the demand for wide-format inkjet printers suitable to printing large advertisements pasted in a show window or on the walls of a building, and the like, is expanding rapidly. Large advertisements are often used, mainly outside, and because long-term weather resistance is demanded, polyvinyl chloride and the like is widely used as the material, and an azo-based pigment having an azo skeleton (mainly used for yellow), a quinacridone-based pigment (mainly used for magenta), a copper phthalocyanine-based pigment (mainly used for cyan), and carbon black (mainly used for black) and the like, all having excellent weather resistance (resistance with respect to light, rain, or wind), are widely used as the pigment.

In addition, in order to perform full color printing, an inkjet ink set is used in which four colors, obtained by adding black ink to the three primary colors, yellow, magenta, and cyan, of ink in the subtractive color process, are combined.

For example, ink compositions disclosed in JP2004-2528A, WO2009/098509A, JP2012-72401A, JP2011-126881A, and JP2005-325279A are known as ink compositions. In addition, thermal transfer sheets disclosed in JP1997-272265A (JP-H09-272265A) are known of the related art.

SUMMARY OF THE INVENTION

An object of the present invention is to provide an inkjet ink composition able to obtain a printed matter with excellent weather resistance and a method for producing the same, an inkjet recording method, a pigment dispersion for an inkjet ink composition and a method of producing the same.

The problems of the present invention are solved by the inkjet ink composition and the method of producing an inkjet composition. Preferable embodiments of the inkjet ink composition will also be described below.

<1> An inkjet ink composition includes C.I. Pigment Yellow 180, a fatty acid amide compound, and a high molecular weight dispersant.

<2> The inkjet ink composition according to <1> in which the fatty acid amide compound is a compound represented by the following formula (B) below,

[Chem. 1]

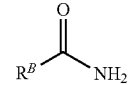

(B)

in the formula (B), $R^B$ represents a saturated or unsaturated aliphatic group having 5 to 30 carbon atoms.)

<3> The inkjet ink composition according to <1> or <2> in which the fatty acid amide compound is an oleamide.

<4> The inkjet ink composition according to any one of <1> to <3> in which the value of $W_B/W_A$ is 0.05 to 0.2 in a case where the content of the C.I. Pigment Yellow 180 is set to $W_A$ and the content of the fatty acid amide compound is set to $W_B$, in the ink composition.

<5> The inkjet ink composition according to any one of <1> to <4>, further containing a solvent.

<6> The inkjet ink composition according to <5>, in which the solvent includes at least one compound selected from a group consisting of alkylene glycol monoalkyl ether acetates, alkylene glycol monoalkyl ethers, alkylene glycol dialkyl ethers, alkylene glycol acetates, polyalkylene glycol monoalkyl ether acetates, polyalkylene glycol monoalkyl ethers, polyalkylene glycol dialkyl ethers, polyalkylene glycol acetates, ketones, and lactones.

<7> The inkjet ink composition according to <5> or <6>, in which the solvent includes at least one compound selected from a group consisting of ethylene glycol monobutyl ether acetate, diethylene glycol diethyl ether, cyclohexanone, and, γ-butyrolactone.

<8> The inkjet ink composition according to any one of <1> to <7>, further containing a polymerization initiator and a polymerizable compound.

<9> The inkjet ink composition according to <8>, in which a content ratio of the polymerizable compound with respect to the solvent in the ink composition (content of polymerizable compound/content of solvent; mass ratio) is 0.1 to 0.2.

<10> A method for producing an inkjet ink composition according to any one of <1> to <9>, the method including: preliminary mixing the C.I. Pigment Yellow 180 and the fatty acid amide compound to obtain a mixture, and mixing the mixture and the high molecular weight dispersant.

<11> An inkjet recording method including: ejecting an ink composition on a recording medium; fixing the ink composition by adding heat to the ejected ink composition and/or curing the ink composition by irradiating the ejected ink composition with active radiation, and the ink composition is the inkjet ink composition according to any one of <1> to <8>.

<12> A pigment dispersion for an inkjet ink composition including: C.I. Pigment Yellow 180; a fatty acid amide compound; and a high molecular weight dispersant.

<13> A method for producing a pigment dispersion for an inkjet ink composition according to <12>, the method including: preliminary mixing the C.I. Pigment Yellow 180 and the fatty acid amide compound to obtain a mixture, and mixing the mixture and the high molecular weight dispersant.

According to the present invention, it is possible to provide an inkjet ink composition able to obtain a printed matter with excellent weather resistance, and a method of producing the same, an inkjet recording method, a pigment dispersion for an inkjet ink composition and a method for producing the same.

DESCRIPTION OF THE PREFERRED EMBODIMENTS

Below, the present invention will be described in detail.

Moreover, in the present specification, the description "xx to yy" indicates a range of numerical values including xx and yy. In addition, "(component A) C.I. Pigment Yellow 180" and the like are also simply referred to as "component A" and the like.

"(Meth)acrylate" or the like is synonymous with "acrylate and/or methacrylate" or the like, and the same applies below.

In addition, the terms "mass percent" and "weight percent" are synonymous, and the terms "parts by mass" and "parts by weight" are synonymous.

(Inkjet Ink Composition)

The inkjet ink composition of the present invention (hereinafter, also referred to as "ink composition" or "ink") contains (component A) C.I. Pigment Yellow 180, (component B) a fatty acid amide compound, and (component C) a high molecular weight dispersant.

An ink composition of the related art containing C.I. Pigment Yellow 180 has a problem of having poor weather resistance despite having good chromogenic property.

Although the mechanism is unclear, the present inventors discovered as a result of detailed investigation that it is possible to obtain an inkjet ink composition able to obtain a printed matter with excellent weather resistance by containing (component A) C.I. Pigment Yellow 180, (component B) a fatty acid amide compound, and (component C) a high molecular weight dispersant.

The ink composition of the present invention can be suitably used as an ink composition for outdoor use because of excellent weather resistance, and further can be particularly suitably used as an ink composition for printing large advertisements pasted in a show window, on the wall of a building or the like.

Below, each component will be described.

(Component A) C.I. Pigment Yellow 180

The ink composition of the present invention contains (component A) C.I. Pigment Yellow 180.

C.I. Pigment Yellow 180 (C.I. Pigment Yellow 180) is a benzimidazolone-based disazo pigment having the structure shown below.

[Chem. 2]

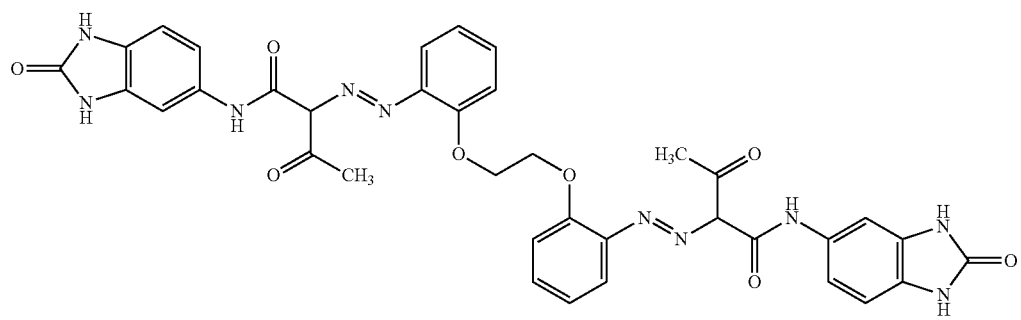

C.I. Pigment Yellow 180

The ink composition of the present invention is preferably an ink composition of the color yellow (also referred to as "yellow ink composition").

In addition, the ink composition of the invention is an inkjet ink composition, that is, an ink composition for inkjet recording.

The ink composition of the present invention is an oil-based ink composition, preferably a solvent ink composition (also referred to as a "solvent ink") or an active radiation curable solvent ink composition, (also referred to as an "active radiation curable solvent ink"), and more preferably an active radiation curable solvent ink composition.

The term "active radiation" in the present invention is not particularly limited if it is active radiation able to apply energy capable of generating initiation species in the ink composition by irradiation thereof, and widely encompasses α-rays, γ-rays, X-rays, ultraviolet rays (UV), visible light rays, electron beams and the like; however, among these, ultraviolet rays and electron beams are preferable from the viewpoint of curing sensitivity and device availability, and ultraviolet rays are particularly preferable. Accordingly, an ink composition curable by irradiating ultraviolet rays as the active radiation is preferable as the ink composition of the present invention.

The content of the component A in the ink composition of the present invention may be appropriately selected according to desired color density in inkjet printing, however, the content of the component A with respect to the total mass of the ink composition is preferably 0.5 mass % to 5 mass %, more preferably 1 mass % to 4 mass %, and particularly preferably 2 mass % to 3.5 mass % on the assumption that a commercially available inkjet printer is used. When in the above ranges, the color reproducibility and the ejection stability are excellent.

In the present invention, other coloring agents (pigments or dyes other than component A) may be used in combination, and known coloring agents can be used as the other coloring agent; however, the ink composition in the present invention particularly preferably contains only C.I. Pigment Yellow 180 as the coloring agent.

Because the pigment, such as the component A, in the ink composition has better chromogenic property the finer it is, the weight average particle size (diameter) is preferably 600 nm or less, more preferably less than 300 nm and still more preferably less than 100 nm. In addition, 5 nm or greater is preferable.

The maximum particle size of the pigment is preferably 3 μm or less, and more preferably 1 μm or less. The particle size of the pigment can be adjusted according to the selection of dispersant and dispersion medium, the setting of the dispersion conditions and filtration conditions and the like. In addition, it is possible to maintain the liquidity and storage stability of the pigment dispersion by controlling the particle size of the pigment.

The weight average particle size and maximum particle size of the pigment in the ink composition can be measured using a commercially available particle size measuring device (laser diffraction/scattering-type particle size distribution analyzer LA-920 manufactured by Horiba Ltd.) or the like.

(Component B) Fatty Acid Amide Compound

The ink composition of the present invention contains (component B) a fatty acid amide compound.

Examples of the fatty acid amide compound include unsaturated fatty acid amide compounds and a saturated fatty acid amide compounds.

In addition, the fatty acid amide compound may be a primary amide compound, a secondary amide compound, or may be a tertiary amide compound; however, a primary amide compound is preferable. With the above aspect, a printed matter with superior weather resistance and abrasion resistance can be obtained, and the ejection stability is superior.

In addition, in the ink composition of the present invention, at least one portion of the fatty acid amide compound is preferably attached or bonded to the surface of the C.I. Pigment Yellow 180 particles. The confirmation method is not particularly limited; however, for example, confirmation can be performed by performing surface analysis or extraction of attached substances on the surface or the like after separation of the component A from the ink composition.

As the fatty acid amide compound, compounds represented by the following formula (B) may be preferably exemplified.

[Chem. 3]

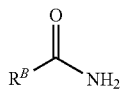

(B)

In the formula (B), $R^B$ represents a saturated or unsaturated aliphatic group having 5 to 30 carbon atoms.

$R^B$ preferably has 7 to 26 carbon atoms, more preferably 12 to 24, and still more preferably 15 to 22 carbon atoms.

Specific examples of the fatty acid amide compound preferably include an oleamide, a erucamide, a behenamide, a lauric amide, a stearic acid amide, an octane amide, and a hexane amide. Among these, an oleamide, a erucamide, a behenamide, a lauric amide, a stearic acid amide and an octane amide are more preferable, and an oleamide is particularly preferable.

In a case where the content of the component A is $W_A$, and the content of the component B is $W_B$ in the ink composition, the value of $W_B/W_A$ is preferably 0.05 to 0.2. When in the above range, the weather resistance is excellent and further, the inkjet ejection stability and strength of the cured film are excellent.

In addition, the content of the component B is preferably 0.01 mass % to 1 mass % with respect to the total mass of the ink composition, more preferably from 0.02 mass % to 0.5 mass %, and particularly preferably 0.05 mass % to 0.5 mass %. When in the above ranges, the weather resistance and abrasion resistance of the printed matter are superior, and further, the ejection stability is excellent.

(Component C) High Molecular Weight Dispersant

The ink composition of the present invention contains (component C) a high molecular weight dispersant.

The term "high molecular weight dispersant" in the present invention means a dispersing agent with a weight average molecular weight of 1,000 or higher. In addition, the high molecular weight dispersant in the present invention is a polymer compound acting or functioning as a dispersant of the component A, and further preferably has adsorption properties and/or bonding properties with respect to the component A.

The weight average molecular weight Mw of the high molecular weight dispersant is preferably in a range of 2,000 to 300,000, more preferably 3,000 to 200,000, still more preferably 4,000 to 100,000, and particularly preferably 5,000 to 100,000. When in the weight average molecular weight of the high molecular weight dispersant is in the above ranges, the dispersibility of the pigment improves and the storage stability and ejection properties of the ink composition become excellent.

Examples of the measurement method of the weight average molecular weight preferably include methods measuring by gel permeation chromatography (GPC). Specifically, the weight average molecular weight can be suitably measured by executing GPC analysis with the following conditions.

1) Device: HLC-8220GPC manufactured by Tosoh Corporation
2) Column (size, manufacturing company, column material): TSK gel SuperAWM-H 3 continuous (6.0 mm I.D×15 cm×3, manufactured by Tosoh Corporation, particulate gel with hydrophilic vinyl polymer as a base material)
3) Solvent: N-methylpyrrolidone (10 mM LiBr)
4) Flow rate: 0.5 mL/min
5) Sample concentration: 0.1 mass %
6) Injection amount: 60 μL
7) Temperature: 40° C.
8) Detector: differential refractometer (RI)

The main chain skeleton of the high molecular weight dispersant is not particularly limited; however, examples thereof include a polyurethane skeleton, a polyacrylic skeleton, a polyester skeleton, a polyamide skeleton, a polyimide skeleton, a polyurea skeleton; and from the viewpoint of storage stability of the ink composition, a polyeurethane skeleton, a polyacrylic skeleton or a polyester skeleton are preferred. In addition, the structure of the high molecular weight dispersant is not particularly limited; however, examples include a random structure, a block structure, a comb-like structure, and a star-like structure.

Examples of the high molecular weight dispersant include, the commercially available wetting and dispersing additive DISPERBYK series 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, and 2150 by BYK Chemie; the commercially available EFKA series 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, 5244, 7701, 7731, and 7469 by BASF; the commercially available SOLSPERSE series 3000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000, and 71000 by Lubrizol Corporation; the commercially available DISPARLON series 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 by Kusumoto Chemicals Ltd.; the commercially available AJISPER series PB-711, PB-821, PB-822, PN-411, and PA-111 by Ajinomoto Fine-Techno Co., Inc.; the commercially available SURFYNOL series 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG; and TGE by Air Products and Chemicals, Inc.; the Olfine series STG; and E1004 by Nissin Chemical Industry Co., Ltd.; the SN Super series 70, 2120 and 2190 manufactured by San Nopco Limited; the commercially available ADEKA COL and ADEKA TOL series by Adeka Corporation; the SANNONIC series, the NAROACTY CL series, the EMULMIN series, the NEWPOL PE series, the IONET M series, the IONET D series, the IONET S series, the IONET T series, and the SANSEPARA 100 series by Sanyo Chemical Industries, Ltd.

The high molecular weight dispersant is not particularly limited in doping concentration to the pigment dispersion; and is preferably determined in consideration of the chemical structure of the dispersant or pigment concentration used.

The content of the high molecular weight dispersant in the ink composition of the present invention is preferably 1 mass % to 75 mass % with respect to the total mass of the component A in the ink composition from the viewpoint of the dispersibility of the component A, more preferably 2 mass % to 50 mass % and particularly preferably 5 mass % to 40 mass %.

(Component D) Solvent

The ink composition of the present invention preferably contains (component D) a solvent.

As the solvent, known solvents used in a solvent ink or an active radiation curable solvent ink can be used, and examples include solvents described in the Solvent Pocketbook New Edition (ed., The Society of Synthetic Organic Chemistry, Japan, published 1994).

The solvent able to be used in the present invention may be used independently, or two or more types may be used in combination.

Examples of the solvent include, (poly)alkylene glycol monoalkyl ethers, such as diethylene glycol monoethyl ether, triethylene glycol monomethyl ether, dipropylene glycol monomethyl ether, or tripropylene glycol monomethyl ether; (poly)alkylene glycol dialkyl ethers, such as ethylene glycol dibutyl ether, diethylene glycol dimethyl ether, diethylene glycol diethyl ether, dipropylene glycol diethyl ether, or tetraethylene glycol dimethyl ether; (poly)alkylene glycol acetates, such as diethylene glycol acetate; (poly)alkylene glycol di-acetates, such as ethylene glycol diacetate, or propylene glycol diacetate; (poly)alkylene glycol monoalkyl ether acetates, such as ethylene glycol monobutyl ether acetate, or propylene glycol monomethyl ether acetate; ketones, such as methyl ethyl ketone, or cyclohexanone; lactones, such as γ-butyrolactone; esters, such as ethyl acetate, propyl acetate, butyl acetate, methyl propionate, or ethyl propionate; and cyclic ethers, such as tetrahydrofuran, or dioxane.

In addition, the (poly)alkylene glycol is preferably (poly)ethylene glycol and/or (poly)propylene glycol.

Among these, alkylene glycol monoalkyl ether acetates, alkylene glycol monoalkyl ethers, alkylene glycol dialkyl ethers, alkylene glycol acetates, polyalkylene glycol monoalkyl ether acetates, polyalkylene glycol monoalkyl ethers, polyalkylene glycol dialkyl ethers, polyalkylene glycol acetates, ketones, and lactones are more preferable; alkylene glycol monoalkyl ether acetates, alkylene glycol dialkyl ethers, polyalkylene glycol monoalkyl ether acetates, polyalkylene glycol dialkyl ethers, ketones, and lactones are still more preferable; and ethylene glycol monobutyl ether acetate, diethylene glycol diethyl ether, cyclohexanone, and γ-butyrolactone are particularly preferable.

The content of the solvent in the ink composition of the present invention is not particularly limited; however, the content is preferably 1 mass % to 98 mass % with respect to the total mass of the ink composition, more preferably 2 mass % to 95 mass %, and particularly preferably 5 mass % to 90 mass %.

(Component E) Polymerization Initiator

The ink composition of the present invention may contain (component E) a polymerization initiator.

From the viewpoint of excellent curability and image fixing properties, a radical polymerization initiator or a cationic polymerization initiator are preferably used, and a radical photopolymerization initiator or a cationic photopolymerization initiator are more preferably used as the polymerization initiator able to be used in the present invention.

<Radical Polymerization Initiator, Cationic Polymerization Initiator>

In the ink composition of the present invention, it is preferable to contain a radical polymerization initiator in a case of containing a radical polymerizable compound, and preferable to contain a cationic polymerization initiator in a case of containing a cationic polymerizable compound.

As the cationic polymerization initiator or radical polymerization initiator in the present invention, a photopolymerization initiator is particularly preferable.

The cationic polymerization initiator or radical polymerization initiator in the present invention is a compound undergoing chemical change through the action of light or interaction with the electroexcitation state of a sensitizing dye and generating a radical, an acid or a base. Among these, the photoradical generator or photoacid generator are preferable from the viewpoint of causing polymerization to be initiated with a simple means of exposure.

In the present invention, the cationic polymerization initiator or the radical polymerization initiator may be appropriately selected from among the polymerization initiators described below in consideration of the relationship or the like with the cationic polymerizable compound or the radical polymerizable compound used in combination and used.

A photopolymerization initiator having sensitivity to irradiated active radiation, for example, ultraviolet rays from 400 nm to 200 nm, far ultraviolet rays, g-rays, h-rays, i-rays, KrF excimer laser light, ArF excimer laser light, electron beams, X-rays, molecular beams or ion beams can be appropriately selected and used.

Specific photopolymerization initiators known to one skilled in the art can be used without limitation, and specifically, for example, numerous descriptions in Chemical Reviews, 93, 435 (1993) by Bruce M. Monroe et al., Journal of Photochemistry and Biology A: Chemistry, 73, 81 (1993) by R. S. Davidson, "Photoinitiated Polymerization—Theory and Applications": Rapra Review vol. 9, Report, Rapra Technology (1998) by J. P Faussier, or Prog. Polym Sci., 21, 1 (1996) by M. Tsunooka et al.

In addition, numerous compounds used in a chemically amplified photoresist or a photo-cationic polymerization are described in ("Organic Materials for Imaging", ed. Japanese Research Association for Organic Electronics Materials, Bunshin Publishing (1993), refer to pp. 187 to 192). Furthermore, a group of compounds causing oxidative or reductive bond cleavage through interaction with the electroexcitation state of a sensitizer, as described in Topics in Current Chemistry, 156, 59 (1990), by F. D. Saeva, Topics in Current Chemistry, 168, 1 (1993), by G. G. Maslak, J. Am. Chem. Soc. 112, 6329 (1990), by H. B. Shuster et al, J. Am. Chem. Soc. 102, 3298 (1980) by I. D. F. Eaton, or the like.

Examples of preferable photopolymerization initiators include (a) aromatic ketones, (b) aromatic onium salts, (c) organic peroxides, (d) hexaarylbiimidazole compounds, (e) ketoxime ester compounds, (f) borate compounds, (g) ajinium compounds, (h) metallocene compounds, (i) active ester compounds, and (j) compounds having a carbon-halogen bond.

Examples of the cationic polymerization initiator (preferably a photoacid generator) include onium salt compounds, such as diazonium salts, phosphonium salts, sulfonium salts, and iodonium salts; or sulfate compounds, such as imidosulfonates, oxime sulfonates, diazodisulfones, disulfones, and o-nitrobenzylsulfonates, generating acid by decomposition through irradiation with radiation.

In addition, from the viewpoint of curability, among the above-described cationic polymerization initiators, aromatic onium salts are preferable, iodonium salts and sulfonium salts are more preferable, and an iodonium $PF_6$ salt and a sulfonium $PF_6$ salt are particularly preferable.

From the viewpoint of curability, the radical polymerization initiator is preferably aromatic ketones.

In addition, the radical polymerization initiator is preferably an acylphosphine oxide compound.

A monoacylphosphine oxide compound and a bisacylphosphine oxide compound or the like can be used as the acylphosphine oxide compound; known monoacylphosphine oxide compounds can be used as the monoacylphosphine oxide compound. For example, the monoacylphosphine oxide compounds disclosed in JP1985-8047B (JP-S60-8047B) and JP1988-40799B (JP-S63-40799B) may be exemplified. Specific examples include isobutyrylmethylphosphinic acid methyl ester, isobutyrylphenylphosphinic acid methyl ester, pivaloylphenylphosphinic acid methyl ester, 2-ethylhexanoyl-phenyl phosphinic acid methyl ester, pivaloylphenylphosphinic acid isopropyl ester, p-tolylphenylphosphinic acid methyl ester, o-tolylphenylphosphinic acid methyl ester, 2,4-dimethylbenzoylphenylphosphinic acid methyl ester, p-t-butylbenzoylphenylphosphinic acid isopropyl ester, acryloylphenylphosphinic acid methyl ester, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, pivaloylphenylphosphinic acid vinyl ester, adipoylbisdiphenylphosphine oxide, pivaloyldiphenylphosphine oxide, p-tolyldiphenylphosphine oxide, 4-(t-butyl)benzoyldiphenylphosphine oxide, 2-methyl-benzoyldiphenylphosphine oxide, 2-methyl-2-ethylhexanoyldiphenylphosphine oxide, 1-methyl cyclohexanoyldiphenylphosphine oxide, 2,4,6-trimethylbenzoyl diphenylphosphine oxide, pivaloylphenylphosphinic acid isopropyl ester and pivaloylaminophenylazo phenylphosphinic acid methyl ester.

A well-known bisacylphosphine oxide compound can be used as the bisacylphosphine oxide compounds. Examples include, for example, bisacylphosphine oxide compounds disclosed in JP1991-101686A (JP-H03-101686A), JP1993-345790A (JP-H05-345790A) and JP1994-298818A (JP-H06-298818A). Specific examples include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxy-phenyl phosphine oxide, bis(2,6-dichlorobenzoyl) decylphosphineoxide, bis(2,6-dichlorobenzoyl)-4-octylphenylphosphine oxide, bis(2,4,6-trimethyl benzoyl)phenylphosphine oxide, bis(2,4,6-trimethyl benzoyl)-2,5-dimethylphenylphosphine oxide, bis(2,6-dichloro-3,4,5-tri-methoxy benzoyl)-2,5-dimethylphenylphosphine oxide, bis(2,6-dichloro-3,4,5-trimethoxy benzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-methylpentylphosphine oxide.

Among these, as the acylphosphine oxide compound in the present invention, bis(2,4,6-trimethyl benzoyl)phenylphosphine oxide (IRGACURE 819, manufactured by BASF), bis (2,6-dimethoxybenzoyl)-2,4,4-trimethylpentylphenylphosphine oxide, 2,4,6-trimethylbenzoyl diphenylphosphine oxide (DAROCUR TPO, manufactured by BASF; LUCIRIN TPO, manufactured by BASF), 1-[4-(2-hydroxyethoxy)phenyl]-2-hydroxy-2-methyl-1-propan-1-one (IRGACURE 2959, manufactured by BASF) are preferable.

The polymerization initiator can be used independently, or two or more types can be combined and used. In addition, a known sensitizer can be used together for the object of improving the sensitivity, as long as it does not interfere with the effects of the invention.

The ink composition of the present invention may contain a compound functioning as a sensitizer (hereinafter, also simply referred to as "sensitizer") in order to promote decomposition of the polymerization initiator by absorption of specific active radiation.

Examples of the sensitizer include polynuclear aromatics (for example, pyrene, perylene, triphenylene, 2-ethyl-9,10-dimethoxy-anthracene, and the like), xanthenes (for example, fluorescein, eosin, erythrosine, rhodamine B, rose bengal, and the like), cyanines (for example, thiacarbocyanine, oxacarbocyanine, or the like), merocyanines (for example, merocyanine, carbomerocyanine and the like), thiazines (for example, thionine, methylene blue, toluidine blue, and the like), acridines (for example, acridine orange, chloroflavin, acriflavine and the like), anthraquinones (for example, anthraquinone and the like), squaryliums (for example, squarylium and the like), and coumarins (for example, 7-diethylamino-4-methyl coumarin and the like).

In addition, a single sensitizer may be used independently, or two or more types may be used in combination.

The content of the polymerization initiator in the ink composition of the present invention is preferably 0.1 mass % to 20.0 mass % with respect to the total mass of the ink composition, more preferably 0.5 mass % to 18.0 mass %, and even more preferably 1.0 mass % to 15.0 mass %. When the addition amount of the polymerization initiator is in the above-described range, the curability is excellent, and, furthermore, it is appropriate from the viewpoint of reducing the surface tackiness.

In addition, the content ratio (mass ratio) of the polymerization initiator to the polymerizable compound which is used together therewith is preferably polymerization initiator:polymerizable compound=0.5:100 to 30:100, more preferably 1:100 to 15:100, and still more preferably 2:100 to 10:100.

(Component F) Polymerizable Compound

The ink composition of the present information preferably contains (component F) a polymerizable compound. In addition, in a case where the (component F) polymerizable compound is contained, the (component E) polymerization initiator is preferably used together therewith.

From the viewpoint of excellent curability and image fixing properties, a radical polymerizable compound or a cationic polymerizable compound is preferably used as the polymerizable compound able to be used in the present invention.

From the viewpoint of image fixing properties, the content of the (component F) polymerizable compound in the ink composition of the present invention is preferably 1 mass % to 98 mass % with respect to the total mass of the ink composition, more preferably 2 mass % to 90 mass %, still more preferably 5 mass % to 50 mass %, and particularly preferably 8 mass % to 20 mass %.

In addition, the content ratio of the (component F) polymerizable compound with respect to the (component D) solvent in the ink composition of the present invention is preferably 0.05 to 0.6 [content of (component F) polymerizable compound/content of (component D) solvent; mass ratio], more preferably 0.1 to 0.4, and still more preferably 0.1 to 0.2. When the content ratio of the (component F) polymerizable compound with respect to the (component D) solvent is in these ranges, an image having excellent abrasion resistance and weather resistance is obtained.

<Radical Polymerizable Compound>

The radical polymerizable compound in the present invention is not particularly limited if a compound in which a radical polymerization reaction occurs through application of energy due to active radiation, heating or the like and is cured, and can be used without regard to the type of monomer, oligomer, or polymer; however, various known radical polymerizable monomers can be used as a photo radical polymerizable monomer in which a polymerization reaction occurs due to the initiation species being generated from a radical polymerization initiator described later. In addition, the radical polymerizable compound may be a monofunctional compound, or may be a polyfunctional compound.

Examples of the radical polymerizable compound include (meth)acrylates, (meth)acrylamides, and aromatic vinyls. Moreover, in cases where both or either of "acrylate", "methacrylate" are indicated, and in cases where both or either of "acryl", "methacryl" are indicated are respectively described as "(meth)acrylate" and "(meth)acryl".

The radical polymerizable compound may be used independently or two or more types may be combined and used.

From the viewpoint of curability and viscosity, the radical polymerizable compound is preferably (meth)acrylates. In particular, from the viewpoint of viscosity, at least one type is preferably selected from a monofunctional (meth)acrylate and a bifunctional (meth)acrylate.

Below, the radical polymerizable compound able to be used in the present invention will be described in detail.

Examples of the (meth)acrylate able to be used in the present invention are given below.

Examples of the monofunctional (meth)acrylate include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxy-butyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butyl phenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethyl succinic acid, 2-methacryloyloxy hexahydrophthalic acid, 2-methacryloyloxyethyl-2-hydroxypropyl phthalate, butoxy diethyleneglycol (meth)acrylate, trifluoroethyl (meth)acrylate, perfluorooctyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, PO-modified nonylphenol (meth)acrylate, and EO-modified 2-ethylhexyl (meth)acrylate.

Specific examples of the bifunctional (meth)acrylate include 1,6-hexanediol di(meth)acrylate, 1,10-decanediol di(meth)acrylate, neopentyl glycol di(meth)acrylate, 2,4-dimethyl-1,5-pentane diol di(meth)acrylate, butyl ethyl propanediol (meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, neopentylglycol hydroxypivalate di(meth)acrylate, EO-modified bisphenol A di(meth)acrylate, bisphenol F polyethoxy (meth)acrylate, polypropylene glycol di(meth)acrylate, oligo propylene glycol di(meth)acrylate, 1,4-butanediol di(meth)acrylate, 2-ethyl-2-butyl-propanediol di(meth)acrylate, 1,9-nonane di(meth)acrylate, propoxylated ethoxylated bisphenol A di(meth)acrylate, and tricyclodecane di(meth)acrylate.

Specific examples the trifunctional (meth)acrylate include trimethylolpropane tri(meth)acrylate, trimethylolehtane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl)isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerin triacrylate.

Specific examples of the tetrafunctional (meth)acrylate include pentaerythritol tetra(meth)acrylate, sorbitol tetra (meth)acrylate, ditrimethylolpropane tetra(meth)acrylate, propionic acid dipentaerythritol tetra(meth)acrylate, ethoxylated pentaerythritol tetra(meth)acrylate.

Specific examples of the pentafunctional (meth)acrylate include sorbitol penta(meth)acrylate, and dipentaerythritol penta(meth)acrylate.

Specific examples of the hexafunctional (meth)acrylate include dipentaerythritol hexa(meth)acrylate, sorbitol hexa (meth)acrylate, phosphazene of alkylene oxide-modified hexa(meth)acrylate, and caprolactone-modified dipentaerythritol hexa(meth)acrylate.

Examples of the (meth)acrylamides able to be used in the present invention include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth) acrylamide, and (meth)acryloyl morpholine.

Specific examples of the aromatic vinyls able to be used in the present invention include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinyl benzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene.

Furthermore, examples of the radical polymerizable monomer able to be used in the present invention include vinyl esters (such as vinyl acetate, vinyl propionate, and vinyl versatate), allyl esters (such as allyl acetate), monomers containing a halogen atom (such as vinylidene chloride, and vinyl chloride), vinyl ether compounds (such as methyl vinyl ether, butyl vinyl ether, hexyl vinyl ether, methoxy vinyl ether, 2-ethylhexyl vinyl ether, methoxyethyl vinyl ether, cyclohexyl vinyl ether, and chloroethyl vinyl ether), vinyl cyanides (such as (meth)acrylonitrile), and olefins (such as ethylene and propylene).

The content of the radical polymerizable compound is preferably 2 mass % to 90 mass % with respect to the total mass of the ink composition, more preferably 5 mass % to 50 mass %, and still more preferably 70 mass % to 90 mass %.

<Cationic Polymerizable Compound>

The cationic polymerizable compound in the present invention is not particularly limited if a compound which is cured by a cationic polymerization reaction occurring through application of energy due to active radiation, heating or the like, and can be used without regard to the type of monomer, oligomer, or polymer; however, various known cationic polymerizable monomers can be used as a photocationic polymerizable monomer in which a polymerization reaction occurs due to the initiation species being generated from a cationic polymerization initiator described later. In addition, the cationic polymerizable compound may be a monofunctional compound, or may be a polyfunctional compound.

From the viewpoint of curability and abrasion resistance, the cationic polymerizable compound in the present invention is preferably an oxetane ring-containing compound and an oxilane ring-containing compound, and more preferably a form containing both an oxetane ring-containing compound and an oxilane ring-containing compound.

The oxilane ring-containing compound (below, also referred to as "oxilane compound") is a compound containing at least one oxilane ring (oxylanyl group, epoxy group) in the molecule, specifically, can be appropriately selected from among those ordinarily used as an epoxy resin, and examples include aromatic epoxy resins, alicyclic epoxy resins, and aliphatic epoxy resins known in the related art. The compound may be any of a monomer, an oligomer or a polymer. In addition, the oxetane ring-containing compound (below, also referred to as "oxetane compound") is a compound including at least one oxetane ring (oxetanyl group) in the molecule.

Below, the cationic polymerizable compound able to be used in the present invention will be described in detail.

Examples of the cationic polymerizable compound include the epoxy compounds, vinyl ether compounds and oxetane compounds disclosed in, for example, the publication of JP1994-9714A (JP-H06-9714A), JP2001-31892A, JP2001-40068A, JP2001-55507A, JP2001-310938A, JP2001-310937A and JP2001-220526A.

Examples of the monofunctional epoxy compound able to be used in the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethyl cyclohexene oxide, 3-acryloyloxymethyl cyclohexene oxide, and 3-vinyl cyclohexene oxide.

In addition, examples of the polyfunctional epoxy compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxy cyclohexyl methyl-3',4'-epoxy cyclohexane carboxylate, 2-(3,4-epoxy cyclohexyl)-7,8-epoxy-1,3-dioxaspiro[5.5]undecane, bis(3,4-epoxycyclohexylmethyl)adipate, vinyl cyclohexene oxide, 4-epoxy vinyl cyclohexane, bis(3,4-epoxy-6-methyl cyclohexyl methyl)adipate, 3,4-epoxy-6-methyl-3',4'-epoxy-6'-methylcyclohexane carboxylate, methylenebis(3,4-epoxycyclohexane), dicyclopentadiene diepoxide, ethylene glycol di(3,4-epoxycyclohexylmethyl)ether, ethylene bis(3,4-epoxy cyclohexane carboxylate), dioctylepoxy hexahydrophthalate, di-2-ethylhexyl epoxy hexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,13-tetradecadiene dioxide, limonene dioxide, 1,2,7,8-diepoxy-octane, and 1, 2, 5, and 6-diepoxycyclooctane.

Among these epoxy compounds, aromatic epoxides and alicyclic epoxides are preferable from the viewpoint of excellent curing rate, and alicyclic epoxides are particularly preferable.

Examples of the monofunctional vinyl ether able to be used in the present invention include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methyl cyclohexyl methyl vinyl ether, benzyl vinyl ether, dicyclopentenyl vinyl ether, 2-di cyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexyl methyl vinyl ether, diethylene glycol monovinyl ether, polyethylene glycol vinyl ether, chloroethyl vinyl ether, chlorobutyl vinyl ether, chloroethoxyethyl vinyl ether, phenyl ethyl vinyl ether, and phenoxy polyethylene glycol vinyl ether.

In addition, examples of the polyfunctional vinyl ether include divinyl ethers, such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, bisphenol F alkylene oxide divinyl ether; or multi-functional vinyl ethers, such as trimethylolethane trivinylether, trimethylolpropane vinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide adducts of trimethylolpropane trivinyl ether, propylene oxide adducts of trimethylolpropane trivinyl ether, ethylene oxide adducts of ditrimethylolpropane tetravinyl ether, propylene oxide adducts of ditrimethylolpropane tetravinyl ether, ethylene oxide adducts of pentaerythritol tetravinyl ether, propylene oxide adducts of pentaerythritol tetravinyl ether, ethylene oxide adducts of dipentaerythritol hexavinyl ether, and propylene oxide adducts of dipentaerythritol hexavinyl ether.

The vinyl ether compound is preferably a di- or trivinyl ether compound from the viewpoint of curability, adhesiveness to the recording medium, surface hardness of the formed image, and the like, and a divinyl ether compound is particularly preferable.

A known oxetane compound as described in the publications of JP2001-220526A, JP2001-310937A, or JP2003-341217A can be arbitrarily selected for use as the oxetane compound.

The oxetane compound able to be used in the present invention is preferably a compound having 1 to 4 oxetane rings in the structure thereof. By using such the compound, maintaining the viscosity of a liquid for inkjet recording in a range for excellent handleability becomes easy, and further, a high adhesiveness of the ink composition after curing to the recording medium can be obtained.

Examples of the monofunctional oxetane compound able to be used in the present invention include, 3-ethyl-3-hydroxymethyl oxetane, 3-(meth)allyloxymethyl-3-ethyloxetane, (3-ethyl-3-oxetanylmethoxy)methyl benzene, 4-fluoro-[1-(3-ethyl-3-oxetanylmethoxy)methyl[benzene, 4-methoxy-[1-(3-ethyl-3-oxetanylmethoxy)methyl]benzene, [1-(3-ethyl-3-oxetanylmethoxy)ethyl]phenyl ether, isobutoxymethyl (3-ethyl-3-oxetanylmethyl)ether, isobornyloxyethyl (3-ethyl-3-oxetanylmethyl)ether, isobornyl (3-ethyl-3-oxetanylmethyl)ether, 2-ethylhexyl (3-ethyl-3-oxetanylmethyl)ether, ethyl diethylene glycol (3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetra-bromo-phenyl (3-ethyl-3-oxetanylmethyl)ether, 2-tetra-bromo-phenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl) ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, and bornyl (3-ethyl-3-oxetanylmethyl)ether.

Examples of the polyfunctional oxetane compound include, 3,7-bis(3-oxetanyl)-5-oxanonane, 3,3'-(1,3-(2-methylenyl) propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis [(3-ethyl-3-oxetanylmethoxy)methyl]propane, ethylene glycol bis(3-ethyl-3-oxetanylmethyl)ether, dicyclopentenyl bis (3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene (3-ethyl-3-oxetanylmethyl) ether, trimethylol propane tris(3-ethyl-3-oxetanylmethyl) ether, 1,4-bis(3-ethyl-3-oxetanylmethoxy)butane, 1,6-bis(3-ethyl-3-oxetanylmethoxy) hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl) ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl) ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, propylene oxide (PO)-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis (3-ethyl-3-oxetanylmethyl)ether, and EO-modified bisphenol F (3-ethyl-3-oxetanylmethyl)ether.

Detailed description is made with regard to such oxetane compounds in JP2003-341217A, paragraphs 0021 to 0084, and the compounds described herein can be suitably used in the present invention.

Among the oxetane compounds used in the present invention, using a compound having 1 to 2 oxetane rings is preferable from the viewpoint of viscosity and adhesion of the liquid for inkjet recording.

The cationic polymerizable compound may be used independently or two or more types may be combined and used.

The content of the cationic polymerizable compound is preferably 2 mass % to 90 mass % with respect to the total mass of the ink composition, more preferably 5 mass % to 50 mass %, and still more preferably 8 mass % to 20 mass %.

<Oligomer>

The ink composition of the present invention preferably contains an oligomer.

The oligomer is ordinarily a polymer in which a limited number (usually 5 to 100) of monomers are bonded, and a known compound referred to as an oligomer is arbitrarily selectable; however, a polymer with a weight average molecular weight of 400 to 10,000 (more preferably 500 or higher to less than 5,000) is preferable.

The oligomer preferably has a polymerizable group, and more preferably has a radical polymerizable group. As the radical polymerizable group, an ethylenically unsaturated group is preferable and a (meth)acryloxy group is more preferable.

The oligomer in the present invention may be any oligomer; and examples include olefin-based (such as ethylene oligomers, propylene oligomers and butene oligomers), vinyl-based (such as styrene oligomers, vinyl alcohol oligomers, vinylpyrrolidone oligomers, acrylate oligomers, and (meth)acrylate oligomers), diene-based (such as butadiene oligomers, chloroprene rubbers, and pentadiene oligomers), ring-opening polymerization-based (such as di-, tri-, tetraethylene glycols, polyethylene glycols, and polyethylimines), polyaddition-based (oligo-ester acrylates, polyamide oligomers, and polyisocyanate oligomers), and addition-condensation oligomers (such as phenolic resins, amino resins, xylene resins, and ketone resins). Among these, oligoester (meth)acrylates are preferable, and among the oligoester (meth)acrylates, urethane (meth)acrylates, polyester (meth)acrylates, and epoxy (meth)acrylates are more preferable, and urethane (meth)acrylates are still more preferable.

Examples of the urethane (meth)acrylates preferably include an aliphatic urethane (meth)acrylate, and an aromatic urethane (meth)acrylate; however, an aliphatic urethane (meth)acrylate is more preferable.

In addition, the urethane (meth)acrylate is preferably a tetrafunctional or less urethane (meth)acrylate and more preferably a bifunctional or less urethane (meth)acrylate.

By including a urethane (meth)acrylate, an ink composition can be obtained in which the adhesiveness to the base material is excellent, and the curability is excellent.

Regarding oligomers, the Oligomer Handbook (edited by Junji Furukawa, The Chemical Daily Co., Ltd.) can be referenced.

In addition, the oligomer may be used independently, or two or more types may be used in combination.

In addition, examples of commercially available oligomers can include the examples shown below.

Examples of the urethane (meth)acrylate include, for example, R1204, R1211, R1213, R1217, R1218, R1301, R1302, R1303, R1304, R1306, R1308, R1901, R1150, and the like manufactured by Dai-Ichi Kogyo Seiyaku Co., Ltd., the EBECRYL series manufactured by Daicel-Cytec Co. Ltd., (for example, EBECRYL 230, 270, 4858, 8402, 8804, 8807, 8803, 9260, 1290, 1290K, 5129, 4842, 8210, 210, 4827, 6700, 4450, and 220), NK Oligo U-4HA, U-6HA, U-15HA, U-108A, U200AX, and the like manufactured by Shin-Nakamura Chemical Co. Ltd., Aronix M-1100, M-1200, M-1210, M-1310, M-1600, M-1960, and the like manufactured by Toagosei Co and CN9001 manufactured by Sartomer Company Inc.

Examples of the polyester (meth)acrylate include, for example, the EBECRYL series manufactured by Daicel-Cytec Co. Ltd., (for example, EBECRYL 770, IRR467, 81, 84, 83, 80, 675, 800, 810, 812, 1657, 1810, IRR302, 450, 670, 830, 870, 1830, 1870, 2870, IRR267, 813, IRR483, 811, and the like), and Aronix M-6100, M-6200, M-6250, M-6500, M-7100, M-8030, M-8060, M-8100, M-8530, M-8560, M-9050, and the like manufactured by Toagosei Co.

In addition, examples of the epoxy(meth)acrylates include, for example, the EBECRYL series manufactured by Daicel-Cytec Co. Ltd., (for example, EBECRYL 600, 860, 2958, 3411, 3600, 3605, 3700, 3701, 3703, 3702, 3708, RDX63182, 6040 and the like).

(Component G) Resin

The ink composition of the present invention may contain (component G) a resin, and particularly preferably contains the (component G) resin in a case where the ink composition of the present invention is a solvent ink composition. Moreover, the (component G) resin is a resin other than the component C.

The weight average molecular weight Mw of the (component G) resin is preferably in a range of 2,000 to 300,000, more preferably 3,000 to 200,000, still more preferably 4,000 to 100,000, and particularly preferably 5,000 to 100,000. Moreover, the measurement method of the weight average molecular weight is the same as the measurement method of the weight average molecular weight explained above.

Examples of the resin include fiber-based resins, such as acrylic resins, styrene-acrylic resins, rosin-modified resins, phenol resins, terpene-based resins, polyester resins, polyamide resins, epoxy resins, vinyl chloride-vinyl acetate copolymers, and cellulose acetate butylates, and vinyl toluene-α-methylstyrene copolymers.

The resin may be used independently, or two or more types may be mixed and used.

Among these, acrylic resins and/or vinyl chloride-vinyl acetate copolymers are preferable, and acrylic resins and vinyl chloride-vinyl acetate copolymers are more preferable. In addition, the acrylic resin is preferably a methyl methacrylate-n-butyl methacrylate copolymer.

The content of the resin in the ink composition of the present invention is preferably 0.2 mass % to 15 mass %, more preferably 1 mass % to 10 mass %, and particularly preferably 2 mass % to 8 mass %.

(Component H) Surfactant

In order to provide ejection properties stabilized over the long term, a surfactant may be added in the ink composition of the present invention.

Examples of the surfactant include those disclosed in the publications of JP1987-173463A (JP-S62-173463A) and JP1987-183457A (JP-S62-183457A). For example, examples include anionic surfactants, such as dialkyl sulfosuccinate salts, alkyl naphthalene sulfosuccinate salts, fatty acid salts; nonionic surfactants, such as polyoxyethylene alkyl ethers, polyoxyethylene alkyl allyl ethers, acetylene glycols, and polyoxyethylene-polyoxypropylene block copolymers; and cationic surfactants, such as alkyl amine salts and quaternary ammonium salts. In addition, fluorine-based surfactants (for example, organic fluoro compounds and the like) or silicone-based surfactants (for example, polysiloxane compounds and the like) may be used as the surfactant. The organic fluoro compounds are preferable for their hydrophobicity. Examples of the organic fluoro compound include, for example, fluorine-based surfactants, oil-like fluorine-based compounds (for example, fluorine oils) and solid fluorine compound resins (for example, tetrafluoroethylene resin) and those described in the publications of JP1982-9053B (JP-S57-9053B) (columns 8 to 17) and JP1987-135826B (JP-S62-135826B). The polysiloxane compound is preferably a modified polysiloxane compound in which an organic group is introduced to a portion of the methyl group of a dimethyl polysiloxane. Examples of modification include polyether-modified, methylstyrene-modified, alcohol-modified, alkyl-modified, aralkyl-modified, fatty acid ester-modified, epoxy-modified, amine-modified, amino-modified and mercapto-modified; however, the invention is not limited thereto. The methods of modification may be combined for use. In addition, among these, polyether-modified polysiloxane compounds are preferable from the viewpoint of improvements in inkjet ejection stability. Examples of the polyester-modified polysiloxane compound include, SILWET L-7604, SILWET L-7607N, SILWET FZ-2104, and SILWET FZ-2161 (manufactured by Nippon Unicar Co., Ltd.), BYK306, BYK307, BYK331, BYK333, BYK347, and BYK348 (manufactured by BYK Chemie), and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, silicone-based surfactants are preferable examples.

The content of the surfactant in the ink composition of the present invention is selected according to the intended purpose; however, 0.0001 mass % to 1 mass % with respect to the total mass of the ink composition is preferable.

<Other Components>

The ink composition of the present invention, in addition to the components described above, may have known additives such as a polymerization inhibitor, an ultraviolet absorber, an antioxidant, an antifading agent, a surface conditioner, a leveling agent, a matting agent, a wax, a tackifier, an antifoaming agent, a pH adjuster, a charge imparting agent, a disinfectant, a preservative, a deodorant, a charge controlling agent, a wetting agent, an antiskinning agent, a fragrance, a pigment derivative added as an arbitrary component.

The ink composition of the present invention preferably contains a polymerization inhibitor from the viewpoint of improving storability and suppressing clogging of a inkjet head.

The content of the polymerization inhibitor is preferably 200 to 20,000 ppm with respect to the total mass of the ink composition of the present invention.

Examples of the polymerization inhibitor include nitroso-based polymerization inhibitors, hindered amine-based polymerization inhibitors, hydroquinone, benzoquinone, p-methoxy phenol, TEMPO, TEMPOL, Cuperon Al. Among these, nitroso-based polymerization inhibitors, such as Cuperon Al are preferable examples.

<Physical Properties of Ink Composition>

The viscosity of the ink composition of the present invention at 25° C. is preferably 1 mPa·s to 40 mPa·s, and more preferably 3 mPa·s to 30 mPa·s.

In addition, the viscosity at the ejection temperature (preferably 25° C. to 80° C., more preferably 25° C. to 50° C.) is preferably 1 mPa·s to 30 mPa·s and more preferably 3 mPa·s to 25 mPa·s. The ink composition able to be used in the present invention preferably has the composition ratio appropriately adjusted such that the viscosity is in the above-described ranges. Even in a case where a porous recording medium (support body) is used, it is possible to avoid the penetration of the ink composition into the recording medium and reduce the uncured monomers by setting a high viscosity at room temperature (25° C.). Furthermore, it is possible to inhibit ink bleeding when a droplet of the ink composition lands, and the image quality is improved as a result, which is preferable.

The measurement method of the viscosity is not particularly limited; however, preferable examples include a method using a model RE80 viscometer manufactured by Toki Sangyo Co., Ltd. The model RE80 viscometer is a conical rotor corresponding to an E-type/flat plate type viscometer, and measurement is preferably performed at a rotational speed of 10 rpm using rotor code No. 1 as a rotor. Herein, measurement is preferably performed by changing the rotational speed to 5 rpm, 2.5 rpm, 1 rpm, 0.5 rpm and the like as needed for those having a high viscosity higher than 60 mPa·s.

In addition, the surface tension of the ink composition of the present invention at 25° C. is preferably 18 mN/m to 50 mN/m, and more preferably 20 mN/m to 40 mN/m from the viewpoint of appropriateness of droplet ejecting by the inkjet.

In addition, the surface tension of the ink composition in the present invention is a value measured at a liquid temperature of 25° C. with the Wilhelmy method using an ordinarily used surface tensiometer (for example, a CBVP-Z surface tensiometer manufactured by Kyowa Interface Science Co., Ltd, or the like).

(Pigment Dispersion for Inkjet Ink Composition)

The pigment dispersion for an inkjet ink composition of the present invention (hereinafter, also referred to as "pigment dispersion for an ink composition" or "pigment dispersion") contains (component A) C.I. Pigment Yellow 180, (component B) a fatty acid amide compound, and (component C) a high molecular weight dispersant.

The pigment dispersion for an ink composition of the present invention preferably contains (component D) a solvent.

In addition, the pigment dispersion for an ink composition of the present invention may contain (component E) a polymerization initiator, (component F) a polymerizable compound, (component G) a resin, (component H) a surfactant, and/or other additives.

Each component has the same meaning as those described above in the ink composition, and the preferable ranges are the same.

The content of the component A in the pigment dispersion of the present invention is not particularly limited; however, the content is preferably 8 mass % to 75 mass % with respect to the total mass of the pigment dispersion, more preferably 10 mass % to 50 mass %, and particularly preferably 20 mass % to 50 mass %.

In a case where the content of the component A in the pigment dispersion is $W'_A$, and the content of the component B in the pigment dispersion is $W'_B$, the value of $W'_B/W'_A$ is preferably 0.05 to 0.2. When in the above range, the weather resistance is excellent and further, the inkjet ejection stability and strength of the cured film are excellent, in a case where the ink composition using the pigment dispersion is used for inkjet recording.

In addition, the content of the component B is preferably 0.1 mass % to 20 mass % with respect to the total mass of the pigment dispersion, more preferably from 0.5 mass % to 10 mass %, and particularly preferably 1 mass % to 6 mass %. When in the above ranges, the weather resistance and abrasion resistance of the printed matter are superior, and further, the ejection stability is excellent, in a case where the ink composition using the pigment dispersion is used for inkjet recording.

The content of the high molecular weight dispersant in the pigment dispersion of the present invention is preferably 1 mass % to 75 mass % with respect to the total mass of the component A from the viewpoint of the dispersibility of the component A, more preferably 2 mass % to 50 mass % and particularly preferably 5 mass % to 40 mass %.

In a case where the pigment dispersion of the present invention contains the (component D) solvent, the content of the component D is not particularly limited; however, the content is preferably 1 mass % to 90 mass % with respect to the total mass of the pigment dispersion, more preferably 5 mass % to 80 mass %, and still more preferably 10 mass % to 70 mass %.

(Method for Producing Inkjet Ink Composition and Method for Producing Pigment Dispersion for Inkjet Ink)

The method for producing an inkjet ink composition preferably includes a preliminary mixing step of mixing (component A) C.I. Pigment Yellow 180 and (component B) a fatty acid amide compound to obtain a mixture, and a mixing step of mixing the mixture and (component C) a high molecular weight dispersant.

In addition, the method for producing a pigment dispersion for an inkjet ink composition preferably includes a preliminary mixing step of mixing (component A) C.I. Pigment Yellow 180 and (component B) a fatty acid amide compound to obtain a mixture, and a mixing step of mixing the mixture and (component C) a high molecular weight dispersant.

In the method for producing, by first mixing the component A and component B, the fatty acid amide compound attaches or bonds to the surface of the C.I. Pigment Yellow 180 particles, and, although the details of the mechanism are unclear, by causing the high molecular weight dispersant to act on the pigment particles in this state, it is assumed that the ejection stability and the weather resistance are improved.

The method for mixing the component A and component B and the method for mixing the mixture including the component A and component B with the component C are not particularly limited, and known methods for mixing can be used.

In addition, in a case where the (component D) solvent is used, the solvent may be added at the stage of the preliminary mixing step, may be added at the stage of the mixing step, may be added at a subsequent step thereto, and further may be added at two or more steps.

The usage amounts of each component are not particularly limited, and may be appropriately adjusted so as to obtain a desired composition.

(Inkjet Recording Method and Inkjet Recording Device)

The inkjet recording method of the present invention is a method ejecting the ink composition of the present invention onto a recording medium (support body, recording material or the like) for inkjet recording, forming an image by fixing the ink composition through heating and volatilizing the solvent and/or by curing the ink composition through irradiating with active radiation with respect to the ink composition ejected on the recording medium.

More specifically, the inkjet recording method of the present invention preferably includes a step of ($a^1$) ejecting an ink composition on a recording medium; ($b^1$) fixing the ink composition by adding heat to the ejected ink composition and/or ($c^1$) curing the ink composition by irradiating the ejected ink composition with active radiation.

In a case where the ink composition of the present invention is a solvent ink, it is preferable to perform at least the step ($b^1$), in a case where the ink composition of the present invention is an active radiation curable solvent ink, it is preferable to perform at least the step ($c^1$), and further, in a case where the ink composition of the present invention is an active radiation curable solvent ink, it is preferable to perform at least the step ($b^1$) and step ($c^1$).

The inkjet recording method of the present invention forms an image using the ink composition on a recording medium by including the step ($a^1$), step ($b^1$) and/or step ($c^1$).

In step ($a^1$) in the inkjet recording method of the present invention, an inkjet recording device as described in detail below can be used.

<Inkjet Recording Device>

The inkjet recording device able to be used in the inkjet recording method of the present invention is not particularly limited, and it is possible to arbitrarily select and use a known inkjet recording device capable of achieving the desired resolution. That is, with a known inkjet recording device including commercially available products, ejection of the ink composition onto the recording medium can be performed in the step ($a^1$) of the inkjet recording method of the present invention.

Examples of the inkjet recording device able to be used in the present invention include, for example, devices including ink supply systems, temperature sensors, and active radiation sources.

The ink supply system, for example, is formed of a source tank including the ink composition of the present invention, a supply pipe, an ink supply tank immediately before the inkjet head, a filter and a piezo-type inkjet head. The piezo-type inkjet head can perform driving so as to enable ejecting multi-size dots of preferably 1 pl to 100 pl, and more preferably 8 pl to 30 pl at a resolution of preferably 320×320 to 4,000×4,000 dpi, more preferably 400×400 to 1,600×1,600 dpi, and still more preferably 720×720 dpi. Moreover, the term dpi used in the present invention represents the number of dots per 2.54 cm.

As described above, for the ink composition of the present invention, since it is preferable that the ejected ink composition be set to a constant temperature, it is preferable that means for stabilizing the ink composition temperature be provided in the inkjet recording device. As sites made a constant temperature, all of the pipe system and parts from the ink tank (the intermediate tank, in a case where there is an intermediate tank) to the nozzle emission surface become targets. That is, insulation and heating can be performed from the ink supply tank to the inkjet head portion.

The temperature control method is not particularly limited; however, for example, it is preferable to provide a plurality of temperature sensors at sites at each pipe, and perform heating control according to the ink flow rate and the environmental temperature. The temperature sensors can be provided in the vicinity of the ink supply tank and the nozzles of the inkjet head. In addition, the head unit to be heated is preferably thermally blocked or insulated such that the device main body is not influenced by the temperature from the outside air. In order to shorten the printer startup time required for heating, or in order to reduce the thermal energy loss, it is preferable to provide insulation from other sites and to decrease the heat capacity of the entire heating unit body.

It is preferable to perform ejection of the ink composition of the present invention using the inkjet recording device described above after lowering the viscosity of the ink composition to preferably 3 mPa·s to 15 mPa·s, and more preferably 3 mPa·s to 13 mPa·s by heating the ink composition to preferably 25° C. to 80° C., and more preferably to 25° C. to 50° C. In particular, it is preferable that the ink composition of the present invention used be one with an ink viscosity of 50 mPa·s or less at 25° C., since ejection can be favorably performed. High ejection stability can be realized by using this method.

Because active radiation curable solvent inks such as the ink composition of the present invention generally have a higher viscosity than aqueous ink compositions used in normal inkjet recording, the viscosity fluctuations according to temperature fluctuations during ejection are large. The changes in the droplet size and changes in the droplet ejection speed are greatly influenced by viscosity fluctuations in the ink, leading to deteriorations in image quality. Accordingly, there is a need to keep the temperature of the ink composition during ejection as constant as possible. Thus, the control range of the temperature of the ink composition being set to preferably ±5° C. of a set temperature, more preferably ±2° C., and still more preferably ±1° C. is appropriate in the present invention.

The ($b^1$) heating the ejected ink composition and fixing the ink composition will be described.

The ink composition ejected on the recording medium is fixed to the surface of the recording medium by the solvent being evaporated by a heating means, or by curing the resin in a case where a resin is included.

The heating means is not particularly limited, if able to dry the solvent; however, a heat drum, hot air, infrared lamp, heating oven, heating plate or the like can be used.

Next, the ($c^1$) step of irradiating the ejected ink compound with active radiation and curing the ink composition will be described.

The ink composition ejected on the recording medium is cured by being irradiated with active radiation. This is because the polymerization initiator included in the ink composition of the present invention generates initiation species, such as radicals, an acid or a base, by decomposing due to irradiation with active radiation, and the polymerization reaction of the radical polymerizable compound is started and promoted by the function of these initiation species. At this time, if a sensitizer is present along with a polymerization initiator in the ink composition, the sensitizer in the system absorbs active radiation and enters an excited state, the decomposition of the polymerization initiator is promoted by the contact with the sensitizer, and a curing reaction with a higher sensitivity can be attained.

Here, the active radiation used can be α-rays, γ-rays, electron beams, X-rays, ultraviolet rays, visible light or infrared light. The peak wavelength of the active radiation also depends on the absorption characteristics of the sensitizer; however, 200 nm to 600 nm is preferable, 300 nm to 450 nm is more preferable, 320 nm to 420 nm is still more preferable, and the active radiation being ultraviolet rays with a peak wavelength in a range of 340 nm to 400 nm is particularly preferable.

In addition, the polymerization initiation system of the ink composition in the present invention has sufficient sensitivity even with low output active radiation. Accordingly, curing is suitably performed with an exposure surface illuminance of preferably 10 mW/cm² to 4,000 mW/cm², and more preferably 20 mW/cm² to 2,500 mW/cm².

A mercury lamp, a gas or solid-state laser, or the like is mainly used as the active energy ray source, and, a mercury lamp and a metal halide lamp are widely known as a light source used in curing of the active radiation curable solvent ink. However, currently, the current move toward becoming mercury free is strongly desired from the viewpoint of environmental protection, and replacement with GaN-based semiconductor ultraviolet light emitting devices is industrially and environmentally extremely effective. Furthermore, LED (UV-LED) and LD (UV-LD) are small size and low cost, and have long service life and high efficiency, and are anticipated as an inkjet printer light source.

In addition, it is possible to use light emitting diodes (LED) and laser diodes (LD) as active radiation sources. In particular, in a case where an ultraviolet source is required, an ultraviolet LED and an ultraviolet LD can be used. For example, Nichia Corporation has brought an ultraviolet LED to market having a wavelength with a main emission spectrum between 365 nm and 420 nm. Furthermore, in a case where an even shorter wavelength is needed, the specification of U.S. Pat. No. 6,084,250A discloses an LED capable of emitting active radiation centered between 300 nm and 370 nm. In addition, other ultraviolet LEDs are available, and can irradiate radiation of different ultraviolet ray bands. In the present invention, a UV-LED is a particularly preferable active radiation source, and particularly preferable is a UV-LED having a peak wavelength of 340 nm to 400 nm.

In addition, the maximum illuminance on the recording medium of the LED is preferably 10 mW/cm² to 2,000 mW/cm², more preferably 20 mW/cm² to 1,000 mW/cm², and particularly preferably 50 mW/cm² to 800 mW/cm².

The ink composition of the present invention is suitably irradiated with such active radiation for preferably 0.01 seconds to 120 seconds and more preferably 0.1 seconds to 90 seconds.

The irradiation conditions of the active radiation and the basic irradiation method are disclosed in JP1985-132767A (JP-S60-132767A). More specifically, light sources are provided on both sides of the head unit including the ejection device of the ink composition, and irradiation using a so-called shuttle system is performed by scanning the head unit and the light sources. The irradiation of the active radiation is performed for a fixed time (preferably 0.01 seconds to 0.5 seconds, more preferably 0.01 seconds to 0.3 seconds, and even more preferably 0.01 seconds to 0.15 seconds) after the ink composition lands. By controlling the time from landing to irradiation to be an extremely short time in this manner, it is possible to prevent the ink composition landed on the recording medium from bleeding before curing. In addition, since it is possible to perform exposure before the ink composition penetrates to a deep portion not reached by the light source even with respect to a porous recording medium, it is possible to suppress unreacted monomer residue, which is preferable.

Furthermore, curing may be completed by another light source not accompanied by driving. In addition, examples of irradiation methods include a method using an optical fiber, and a method in which a mirror surface is irradiated with collimated light (UV), and a method in which the recording portion is irradiated with light. Such curing methods can also be applied to the ink jet recording method of the present invention.

By employing the inkjet recording method as described above, even with respect to various recording media with different surface wetting properties, it is possible to maintain the dot size of the landed ink composition constant, and the image quality improves. In addition, it is preferable that colors be superimposed in order from lowest brightness in order to obtain a color image. By superimposing ink compositions in order from lowest brightness, the radiation rays more easily reach the ink composition of the lower part, and excellent curing sensitivity, reductions in the monomer residue, and improvements in the adhesiveness can be expected. Further, for the irradiation, it is possible to eject, and expose all the colors together; however, exposing one color at a time is preferable from the viewpoint of promotion of curing.

In so doing, by curing the ink composition of the present invention with high sensitivity using the irradiation of active radiation, it is possible to form an image on the recording medium surface.

In the inkjet recording method of the present invention, the ink composition of the invention is preferably a yellow ink composition.

The ink composition of the present invention is preferably used as an ink set formed from a plurality of inkjet inks; and in this case, the ink set combined and used with inks exhibiting each of cyan, magenta, and black in addition to the ink composition is preferably used, and ink exhibiting white is preferably combined and used as needed.

In the inkjet recording method of the present invention, the order of each colored ink composition to be ejected is obviously not limited; however, the colored ink compositions are preferably applied to the recording medium from the highest brightness, and, in a case where the ink composition of the present invention, cyan, magenta, and black are used, application onto the recording medium is preferably performed in order of ink composition of the present invention, cyan, magenta, and black. Further, in a case in which white is used in addition thereto, application onto the recording medium is preferably performed in order of white, ink composition of the present invention, cyan, magenta, and black. Furthermore, the present invention is not limited thereto, and an ink set including at least light cyan, light magenta, cyan, magenta, grey, black, white ink compositions for a total of seven colors in addition to the ink composition of the present invention, and in this case application onto the recording medium is preferably performed in the order of white, light cyan, light magenta, the ink composition of the present invention, cyan, magenta, and black.

In the present invention, the recording medium is not particularly limited, and known recording media can be used as the support body or the recording material. Examples include paper, paper on which a plastic (for example, polyethylene, polypropylene, polystyrene, and the like) is laminated, metal plates (for example, aluminum, zinc, copper, and the like), plastic films (for example, cellulose diacetate, cellulose triacetate, cellulose propionate, cellulose butyrate, cellulose kneader (PBV-0.1, manufactured by Irie-Shokai) to obtain a mixture. Among the constitutions described in the Table 1 below, the remainder of the solvent and the dispersant were added to the mixture, and stirred (10 to 15 minutes, 2,000 to 3,000 rpm) with a mixer manufactured by Silverson Co., Ltd. to obtain a uniform transparent liquid (diluted solution of dispersant). A pigment was added to the transparent liquid (diluted solution of dispersant), and stirred with a mixer (10 to 20 minutes, 2,000 to 3,000 rpm) to obtain 100 parts of a uniform preliminary dispersant. Thereafter, a dispersion process was executed using a circulation bead mill device (Laboratory Mini Mill) manufactured by EIGER Corp, and pigment dispersions A to K were obtained. Dispersion was performed under dispersion conditions in which 100 parts of zirconia beads with a diameter of 0.65 mm was charged, the circumferential speed set to 15 m/s, and a dispersion time set to 3 hours. Moreover, the numerical values in Table 1 represent the parts by mass.

TABLE 1

|  |  | A | B | C | D | E | F | G | H | I | J | K |
|---|---|---|---|---|---|---|---|---|---|---|---|---|
| Pigment | PY180 | 40 | 40 | 40 | 40 | 40 | 40 | 40 | 40 | 40 | — | — |
|  | PY185 | — | — | — | — | — | — | — | — | — | 30 | 30 |
| Fatty Acid Amide | Oleamide | 2 | 4 | 8 | — | — | — | — | — | — | — | 4 |
| Compound | Erucamide | — | — | — | 4 | — | — | — | — | — | — | — |
|  | Behenamide | — | — | — | — | 4 | — | — | — | — | — | — |
|  | Lauric amide | — | — | — | — | — | 4 | — | — | — | — | — |
|  | Stearic amide | — | — | — | — | — | — | 4 | — | — | — | — |
|  | Octanamide | — | — | — | — | — | — | — | 4 | — | — | — |
| High-Molecular Weight Dispersant | EFKA 7496 | 10 | 10 | 10 | 10 | 10 | 10 | 10 | 10 | 10 | 10 | 10 |
| Solvent | Ethelyne glycol monobutyl ethylacetate | 48 | 46 | 42 | 46 | 46 | 46 | 46 | 46 | 50 | 60 | 56 |

The abbreviations denoted in Table 1 are as follows.
PY 180: C.I. Pigment Yellow 180 (NOVOPERM YELLOW PHG, manufactured by Clariant Co. Ltd.)
PY 185: C.I. Pigment Yellow 185 (PALIOTOL YELLOW D 1155, manufactured by BASF Corp.)
Oleamide (DIAMIDE O-200, manufactured by Nippon Kasei Chemical)
Erucamide (DIAMIDE L-200, manufactured by Nippon Kasei Chemical)
Behenamide (DIAMIDE BH, manufactured by Nippon Kasei Chemical)
Lauric amide (DIAMIDE Y, manufactured by Nippon Kasei Chemical)
Stearic acid amide (Amide AP-1, manufactured by Nippon Kasei Chemical)
Octanamide (O0238, manufactured by Tokyo Chemical Industry Co., Ltd)
EFKA 7496 (high molecular weight dispersant, manufactured by BASF Corp., amine value: 17 mgKOH/g)
Ethylene glycol monobutyl ether acetate (B0700, manufactured by Tokyo Chemical Industry Co., Ltd)

acetate butyrate, cellulose nitrate, polyethylene terephthalate, polyethylene, polystyrene, polypropylene, polycarbonate, polyvinyl acetal, and the like), paper or plastic films on which the above-described metals are laminated or deposited. In addition, a non-absorbent recording medium can be suitably used, and further polyvinyl chloride can be particularly preferably used as the recording medium in the present invention.

Examples

Below, the present invention will be described in further detail using examples; however, the present invention is not limited thereto. Moreover, the term "parts" in the description below indicates "parts by mass" unless otherwise specified, and further, "%" is assumed to represent "mass %".

(Preparation of Pigment Dispersion A to K)

Among the constitutions described in Table 1 below, 24 parts of solvent were mixed with components other than the dispersant and kneaded for 30 to 60 minutes with a tabletop (Preparation of Ink Composition)

With regard to the ink compositions A1 to K1 and the ink composition A2 to K2, among the compositions disclosed in Table 2 below, components other than the pigment dispersion were stirred (10 to 15 minutes, 2,000 to 3,000 rpm) with a mixer manufactured by Silverson Co., Ltd. to obtain a uniform transparent liquid. The pigment dispersions A to K prepared as described above were added to the transparent liquid, and stirred (10 to 20 minutes, 2,000 to 3,000 rpm) to obtain the ink compositions respectively. The "A" to "K" of ink compositions A1 to K1 and ink compositions A2 to K2 correspond to the pigment dispersions A to K used respectively.

Moreover, the ink compositions after preparation were subjected to a filtration process in a 1.5 μm filter (PROFILE STAR, manufactured by PALL Corporation). The numerical values in the Table 2 below indicate parts by mass.

TABLE 2

| Composition of Ink Compositions A1 to K1 | | Composition of Ink Compositions A2 to K2 | |
| --- | --- | --- | --- |
| Component | Amount | Component | Amount |
| Resin A | 2.5 | Surfactant A | 0.1 |
| Resin B | 2.5 | Irg2959 | 2 |
| Ethelyne glycol monobutyl ethylacetate | 77 | Irg819 | 4 |
| Cyclohexanone | 10 | FLORSTAB UV12 | 0.5 |
| Pigment Dispersion | 8 | Oligomer A | 5 |
| | | Monomer B | 5 |
| | | γ-butylolactone | 16 |
| | | Diethelyne glycol diethyl ester | 59.4 |
| | | Pigment Dispersion | 8 |

In addition, abbreviations denoted in Table 2 other than those described above are as follows.
Resin A: ELVACITE 2013 (methyl methacrylate-n-butyl methacrylate copolymer (mass ratio 36/64, Mw: 37,000, manufactured by Lucite International Inc.))
Resin B: VINNOL E15/45 (vinyl chloride-vinyl acetate copolymer, manufactured by WACKER)
Cyclohexanone (C0489, manufactured by Tokyo Chemical Industry Co., Ltd)
Surfactant A, (BYK 331, polyether modified polydimethylsiloxane, manufactured by BYK Chemie)
Irg 2959: photopolymerization initiator (IRGACURE 2959, 1-[4-(2-hydroxyethoxy)phenyl]-2-hydroxy-2-methyl-1-propane-1-one, manufactured by BASF Corp.)
Irg 819: photopolymerization initiator (IRGACURE 819, bis(2,4,6-trimethylbenzoyl)phenyl phosphine oxide, manufactured by BASF Corp.)
FLORSTAB UV 12: nitroso-based polymerization inhibitor (manufactured by Kromachem Ltd.)
Oligomer A (CN 9001, urethane acrylate, manufactured by Sartomer Company, Inc.)
Monomer B (SR454, ethoxylated trimethylolpropane 3 mole adduct triacrylate, manufactured by Sartomer Company, Inc.)
γ-butylolactone (B0767, manufactured by Tokyo Chemical Industry Co., Ltd)
Diethylene glycol diethyl ether (B0489, manufactured by Tokyo Chemical Industry Co., Ltd)

(Printing Test)

The obtained ink compositions A1 to K1 and ink compositions A2 to K2 were respectively used, and the printing test shown below was performed.

The ink compositions prepared as above were charged into a commercially available inkjet printer (SJ-745EX, manufactured by Roland Corp.), and printing samples (printed matter) were prepared using the inkjet printer. The printed matter was yellow 100%. The base material was polyvinyl chloride (PVC, adhesive sheet type).

Moreover, here the term 100% is conditions of the maximum ink amount obtained in a case where printed according to the standard printing conditions of the inkjet printer described above.

In addition, with regard to the ink compositions A2 to K2, UV exposure was performed after printing with a UV exposure device (UV Lamp System (F300SQ) and Transport belt (LC-6B) manufactured by Fusion UV Inc.).

<Evaluation of Weather Resistance>

The printed matter prepared as above were aged in an Xe test chamber (model: Q-SUN, conditions: according to SAE Standard J 2527) manufactured by Q-Lab, and the hues (La*b*) before and after aging were compared. Moreover, the hues were measured using a colorimeter (SpectroEye, manufactured by Xrite, Inc.), and measured at timings of 500 hours, 600 hours, 700 hours and 800 hours. The evaluation criteria are as follows. The times where the color difference (ΔE) exceeded 30 are shown in Table 3.
Outstanding: Even exceeding 800 hours, color difference (ΔE) is 30 or lower.
Excellent: Between over 700 hours and 800 hours or less, ΔE exceeds 30.
Good: Between over 600 hours and 700 hours or less, ΔE exceeds 30.
Normal: Between over 500 hours and 600 hours or less, ΔE exceeds 30.
Poor: at 500 hours or less, ΔE exceeds 30.

Moreover, the computation formula for the color difference (ΔE) is the formula shown below.

$$\Delta E = \sqrt{(L_{before\ aging} - L_{after\ aging})^2 + (a*_{before\ aging} - a*_{after\ aging})^2 + (b*_{before\ aging} - b*_{after\ aging})^2}$$ [Equation 1]

<Evaluation of Abrasion Resistance (Dry Conditions)>

The surface of the printed matter prepared as above was rubbed using a dried cotton cloth, and the number of times of rubbings until the film was torn or color was lost was counted. The evaluation criteria are as follows, and the results are shown in Table 3.
Excellent: Even if the number of times of rubbings is 20 or higher, film tearing or color loss did not occur.
Good: film tearing or color loss occurred at a number of times of rubbings of 15 or higher and less than 20.
Normal: film tearing or color loss occurred at a number of times of rubbings of 10 or higher and less than 15.
Poor: film tearing or color loss occurred at a number of times of rubbings of less than 10.

<Evaluation of Abrasion Resistance (Solvent Conditions)>

The surface was rubbed using a cotton cloth wetted with isopropyl alcohol (IPA), and the number of times of rubbings until the film was torn or color was lost was counted. The evaluation criteria are as follows, and the results are shown in Table 3.
Excellent: even at a number of times of rubbings of 10 or higher, film tearing or color loss did not occur.
Good: film tearing or color loss occurred at a number of times of rubbings of 5 or higher and less than 10.
Normal: film tearing or color loss occurred at a number of times of rubbings of 2 or higher and less than 5.
Poor: film tearing or color loss occurred at a number of times of rubbings of 1.

<Continuous Printing Text Evaluation>

Five A0 size solid images were continuously printed, and the number of occurred nozzle omissions was counted. The evaluation criteria are as follows, and the results are shown in Table 3.
Excellent: No nozzle omissions even when printing of 5 sheets was executed.
Good: One nozzle omission after printing of 5 sheets executed.
Normal: Two nozzle omissions after printing of 5 sheets executed.
Poor: Three or more nozzle omissions after printing of 5 sheets executed.

TABLE 3

| | Ink Composition | | | | | | | | | | |
| --- | --- | --- | --- | --- | --- | --- | --- | --- | --- | --- | --- |
| | A1 | B1 | C1 | D1 | E1 | F1 | G1 | H1 | I1 | J1 | K1 |
| Weather Resistance | 600 | 800 | 800 | 700 | 700 | 700 | 700 | 700 | <500 | <500 | <500 |
| Abrasion Resistance | 15 | 14 | 13 | 14 | 14 | 14 | 14 | 14 | 15 | 15 | 15 |

TABLE 3-continued

| (Drying Conditions) Abrasion Resistance (Solvent Conditions) | 3 | 3 | 3 | 3 | 3 | 3 | 3 | 3 | 3 | 3 | 3 |
|---|---|---|---|---|---|---|---|---|---|---|---|
| Continuous Printing Test | Excellent | Excellent | Good | Excellent | Excellent | Excellent | Excellent | Excellent | Excellent | Excellent | Excellent |

| | Ink Composition | | | | | | | | | | |
|---|---|---|---|---|---|---|---|---|---|---|---|
| | A2 | B2 | C2 | D2 | E2 | F2 | G2 | H2 | I2 | J2 | K2 |
| Weather Resistance | 600 | 900 | 900 | 700 | 700 | 700 | 700 | 700 | <500 | <500 | <500 |
| Abrasion Resistance (Dry Conditions) | >20 | >20 | >20 | >20 | >20 | >20 | >20 | >20 | >20 | >20 | >20 |
| Abrasion Resistance (Solvent Conditions) | >20 | >20 | >20 | >20 | >20 | >20 | >20 | >20 | >20 | >20 | >20 |
| Continuous Printing Test | Excellent | Excellent | Excellent | Excellent | Excellent | Excellent | Excellent | Excellent | Excellent | Excellent | Excellent |

Moreover, the numerical values in the weather resistance column in Table 3 indicate time in which ΔE exceeds 30 and the numerical values in the abrasion resistance column indicate the number of times of rubbings at which film tearing or color loss occurs.

This application claims priority under 35 U.S.C. §119 of Japanese Patent application JP 2012-189065, filed on Aug. 29, 2012, the entire contents of which are hereby incorporated by reference.

What is claimed is:

1. An inkjet ink composition comprising:
   C.I. Pigment Yellow 180;
   a fatty acid amide compound; and
   a high molecular weight dispersant, wherein
   the fatty acid amide compound is a compound represented by the following formula (B),

(B)

in formula (B), $R^B$ represents a saturated or unsaturated aliphatic group having 5 to 30 carbon atoms, and
   a value of $W_B/W_A$ is 0.05 to 0.2 in a case where the content of the C.I. Pigment Yellow 180 is set to $W_A$ and the content of the fatty acid amide compound is set to $W_B$, in the ink composition.

2. The inkjet ink composition according to claim 1, wherein the fatty acid amide compound is an oleamide.

3. The inkjet ink composition according to claim 1, further comprising a solvent.

4. The inkjet ink composition according to claim 3, wherein the solvent includes at least one compound selected from a group consisting of alkylene glycol monoalkyl ether acetates, alkylene glycol monoalkyl ethers, alkylene glycol dialkyl ethers, alkylene glycol acetates, polyalkylene glycol monoalkyl ether acetates, polyalkylene glycol monoalkyl ethers, polyalkylene glycol dialkyl ethers, polyalkylene glycol acetates, ketones, and, lactones.

5. The inkjet ink composition according to claim 3, wherein the solvent includes at least one compound selected from a group consisting of ethylene glycol monobutyl ether acetate, diethylene glycol diethyl ether, cyclohexanone, and, γ-butyrolactone.

6. The inkjet ink composition according to claim 1, further comprising a polymerization initiator and a polymerizable compound.

7. The inkjet ink composition according to claim 3 further comprising a polymerizable compound, wherein the content ratio of the polymerizable compound with respect to the solvent in the ink composition is 0.1 to 0.2.

8. A method for producing an inkjet ink composition according to claim 1, the method comprising:
   preliminary mixing the C.I. Pigment Yellow 180 and the fatty acid amide compound to obtain a mixture, and
   mixing the mixture and the high molecular weight dispersant.

9. An inkjet recording method comprising:
   ejecting an ink composition on a recording medium;
   fixing the ink composition by adding heat to the ejected ink composition and/or curing the ink composition by irradiating the ejected ink composition with active radiation, and
   the ink composition is the inkjet ink composition according to claim 1.

10. A pigment dispersion for an inkjet ink composition comprising:
    C.I. Pigment Yellow 180;
    a fatty acid amide compound; and
    a high molecular weight dispersant, wherein
    the fatty acid amide compound is a compound represented by the following formula (B),

(B)

in formula (B), $R^B$ represents a saturated or unsaturated aliphatic group having 5 to 30 carbon atoms, and
   a value of $W_B/W_A$ is 0.05 to 0.2 in a case where the content of the C.I. Pigment Yellow 180 is set to $W_A$ and the content of the fatty acid amide compound is set to $W_B$, in the ink composition.

11. The method for producing a pigment dispersion for an inkjet ink composition according to claim 10, the method comprising:
 preliminary mixing the C.I. Pigment Yellow 180 and the fatty acid amide compound to obtain a mixture, and
 mixing the mixture and the high molecular weight dispersant.

\* \* \* \* \*